(No Model.)
H. C. WHITE.
STEREOSCOPE.
No. 571,716. Patented Nov. 17, 1896.
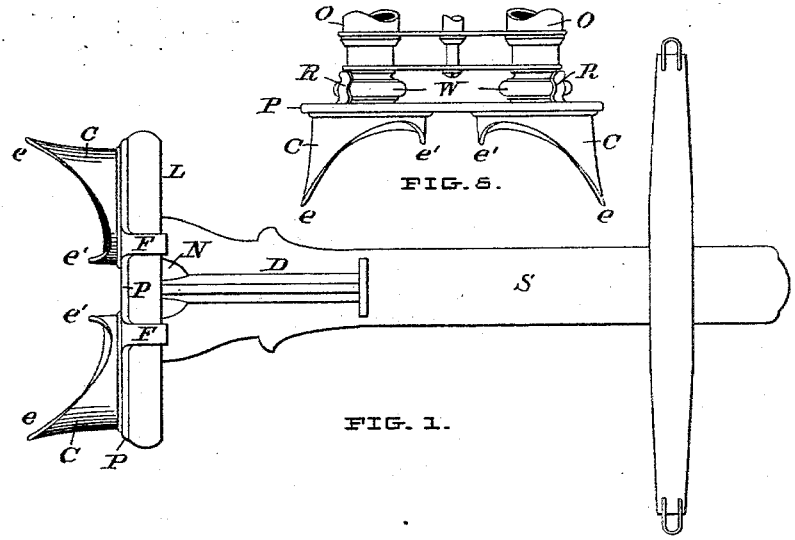
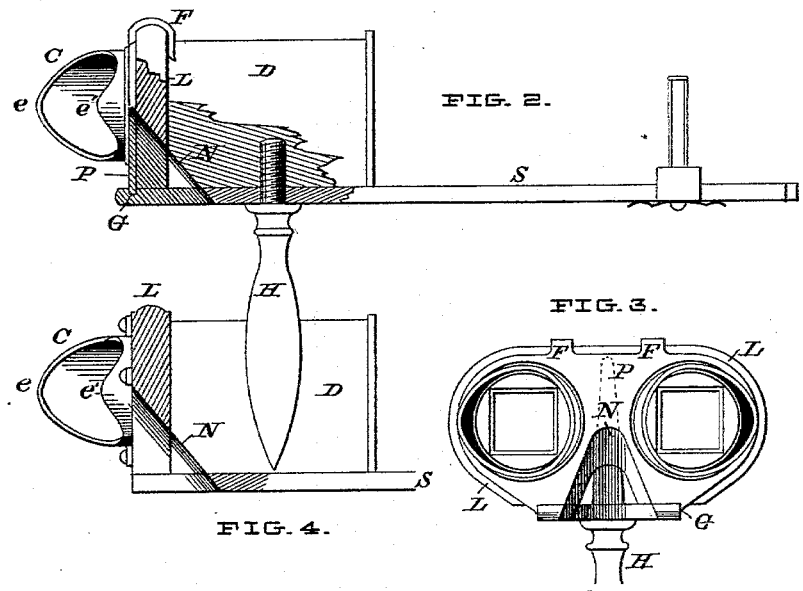
WITNESSES:
Emily Scott
Luther B. Newton.
INVENTOR.
HAWLEY C. WHITE,
By Franklin Scott, Attorney.

UNITED STATES PATENT OFFICE.

HAWLEY C. WHITE, OF BENNINGTON, VERMONT, ASSIGNOR TO THE H. C. WHITE COMPANY, OF SAME PLACE.

STEREOSCOPE.

SPECIFICATION forming part of Letters Patent No. 571,716, dated November 17, 1896.

Application filed February 19, 1896. Serial No. 579,830. (No model.)

*To all whom it may concern:*

Be it known that I, HAWLEY CASTLE WHITE, manufacturer, of North Bennington, in the county of Bennington and State of Vermont, have invented certain new and useful Improvements in Stereoscopes and other Binocular Instruments, of which invention the subjoined description, in connection with the accompanying drawings, constitutes a specification.

This invention relates to means connected with or capable of being attached to such binocular instruments as stereoscopes, opera and field glasses, and similar instruments which afford provisions for resting the instrument against some part of the face of the observer and at the same time furnish a perfect separate shield for each eye, which in itself shall form a dark chamber for each eye.

The invention is fully shown in the drawings, wherein—

Figure 1 is a plan view of an ordinary stereoscope with my improvement applied thereto as a separable attachment. Fig. 2 is a side elevation in part and in part a vertical longitudinal section of the object shown in Fig. 1. Fig. 3 is a front end view of the scope shown in Fig. 1. Fig. 4 is a similar view of a scope having my improvement applied thereto as a constituent part of the structure. Fig. 5 shows my invention as a separable attachment applied to an ordinary opera-glass.

Such instruments as stereoscopes have heretofore been supplied with a screen for the eyes which has been attached to the lens-holder and has been partially or wholly fitted to the shape of the forehead and cheeks of the human face so as to partially or wholly exclude extraneous light from outside the instrument from the eyes. As such instruments have been constructed it has been found difficult to so shape the edge of the hood that it will fairly fit all faces with that degree of perfection requisite to effect complete exclusion of light from the chamber within the hood. Another objection which exists to a hood which embraces both lenses and eyes in a single chamber is the fact that it cannot be well fitted to the face and bring the eyes of the user closely to the lenses. With the most approved styles the distance between the eyes and the lenses varies from one and one-half to two inches. As it is desirable, in order to secure the best view of the objects seen through the lenses, to have the eyes brought into as close proximity to the lenses as possible, the subject-matter of this patent has been devised which is designed to accommodate itself to the vision of every person.

The invention consists of a pair of tubular shields C C, which are adapted to fit the rims of the eye-sockets. Each of these shields has an extension $e$, which extends rearwardly and covers the outer corner of the eye and bears against the temple of the face. Another projection $e'$ extends inwardly on the inside of the nose against the inner corner of the eye. The upper edge of the shield conforms to the shape of the arch of the eyebrow, while its under edge fits the shape of the cheek-bone beneath the eye. These shields are so shaped that when applied to the face they will make close contact therewith about each eye and effectually obstruct the admission of extraneous light to the interior of the eye-chamber.

As an additional provision for bringing the eyes up closely to the lenses a liberal gap N is made in the shaft S, lens-frame L, and division-piece D, which gap is a novel feature in hand stereoscopes. This gap permits the use of a hood of much narrower dimensions than those in common use in that class of stereoscopes in which a hood is used, and thus greatly increases the efficiency of scopes provided with properly-shaped hoods as well as of those provided with independent eye-pieces.

The lenses of the stereoscope are set in the lens-frames L, Figs. 2 and 4, in the ordinary way. As the construction of the lens-frame, shaft, picture-holder, and division-piece may be according to any suitable design, it is not here described, as it is considered immaterial, provided the lens-frame is equipped with the duplicate eye-shields, either as a permanent attachment or a detachable fixture, and the framework is notched for the nose, as shown.

As one method of carrying out my invention of supplying binocular instruments with the described eye-shields, I provide a flat plate P, which is perforated within the seat of the eye-shields C C, as seen in Fig. 3, and is provided with grappling clips or hooks F F for attachment to a stereoscope, as seen in Fig. 1, or R R for attachment to the lens-pieces W of an opera-glass, as seen in Fig. 5. In the first instance the plate P is slipped into position over the lens-frame, the hooks F F catching onto or over the edge of the lens-frame L of the stereoscope. The lower edge of the plate finds a seat in the transverse slot G, provided therefor in the end of the shaft S. In the latter case the plate P is provided with a sufficient number of the grappling spring-clips R R as may be necessary to firmly attach it to the eyepieces of the opera or field glass.

I therefore claim as my invention—

1. An eyepiece for stereoscopes and other optical instruments consisting of a tubular piece provided with a lens and having the end which contacts with the user's face fitted to the orbit of the eye by having an outer projection fitted to the temple and an inner projection fitted to enter the sunken depression at the inner corner of the eye beside the nose.

2. A stereoscope fitted with tubular eyepieces for the eyes, each having an outer projection fitted to the temple and an inner projection fitted to enter the sunken depression at the inner corner of the eye, whereby a dark chamber for each eye is obtained in use.

In witness whereof I have hereto subscribed my name in the presence of two witnesses.

HAWLEY C. WHITE.

Witnesses:
FRANKLIN SCOTT,
EMILY SCOTT.